(No Model.)

A. RINK.
MOISTENING DEVICE FOR ENVELOPES, &c.

No. 489,267. Patented Jan. 3, 1893.

WITNESSES:
O. F. Eagle.
L. Douville.

INVENTOR
August Rink.
BY John A. Wiedersheim
ATTORNEY.

United States Patent Office.

AUGUST RINK, OF PHILADELPHIA, PENNSYLVANIA.

MOISTENING DEVICE FOR ENVELOPES, &c.

SPECIFICATION forming part of Letters Patent No. 489,267, dated January 3, 1893.

Application filed September 10, 1892. Serial No. 445,542. (No model.)

*To all whom it may concern:*

Be it known that I, AUGUST RINK, a citizen of the United States, residing in the city and county of Philadelphia, State of Pennsylvania, have invented a new and useful Improvement in Moistening Devices for Envelopes, Wrappers, &c., which improvement is fully set forth in the following specification and accompanying drawings.

My invention consists of a moistening device for envelopes, wrappers, postage and other stamps, &c., and exerting pressure on the same, as will be hereinafter fully set forth.

Figure 1:
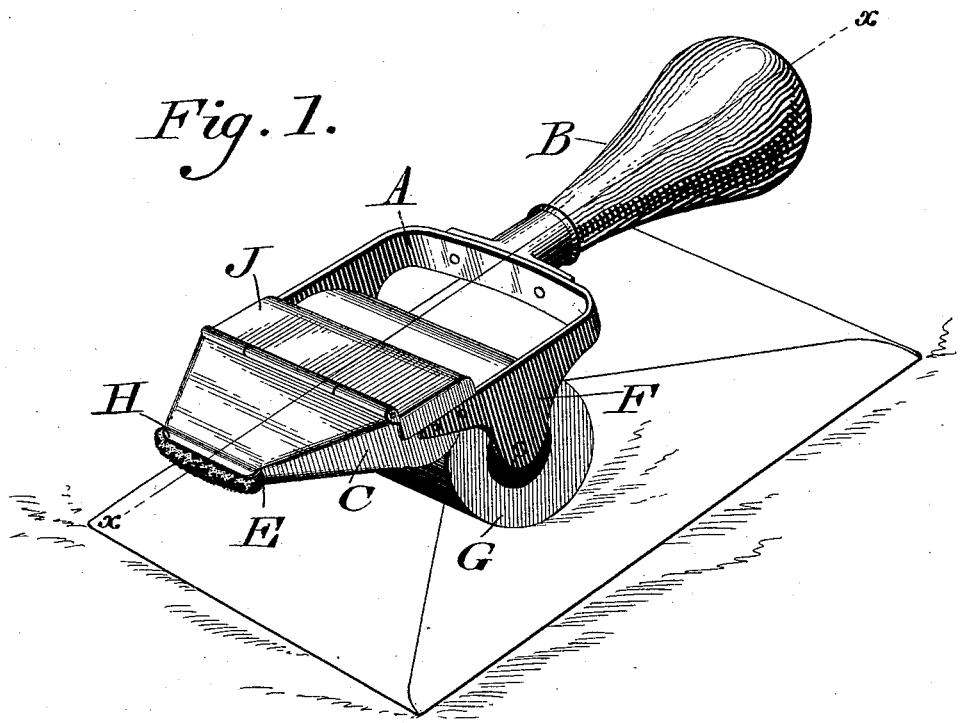
Figure 2:
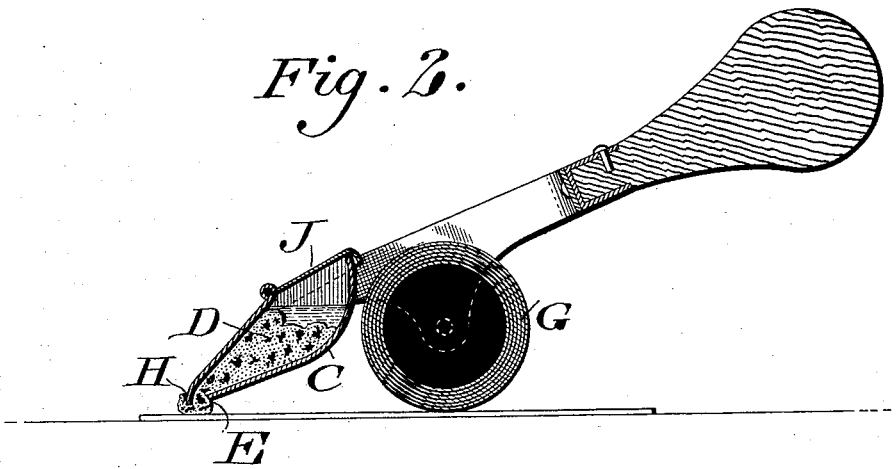

Figure 1 represents a perspective view of a moistening and pressing device embodying my invention. Fig. 2 represents a section thereof on line $x, x$, Fig. 1.

Similar letters of reference indicate corresponding parts in the two figures.

Referring to the drawings:—A designates a U-shaped or bifurcated arm, to the rear end of which is attached a handle B, by which the device may be conveniently operated.

C designates a chamber which is secured to the front end of the arm A, the same containing a piece D of sponge or other absorbent material, one end of which protrudes through the throat E at the front end of said chamber. On the sides of the arm A are ears F, on which is mounted the roller G.

The upper wall of the chamber C, is extended downwardly over the throat E, thus forming a lip or deflector H, and said chamber is provided with a lid J, which permits of access to the interior of the chamber, it being noticed that said chamber is supplied with water, so as to thoroughly saturate the piece D and moisten the protruding end thereof. The device may now be presented to the adhesive material on an envelope, wrapper, &c., and rolled over the same, as shown in Fig. 2, whereby the moisture in the protruding end of the piece D is applied to said adhesive material, the effect of which is evident.

When the device is removed, from say, the envelope or wrapper, the latter is closed, and the roller G pressed thereover so that it is securely sealed, and a smooth finish produced.

When the lid J is opened, the chamber C may be replenished with water, and the absorbent piece D adjusted, removed, &c.

Owing to the lip H, the water in the chamber C is prevented from escaping in front, while it is also directed downwardly, properly to the protruding end of the absorbent.

Having thus described my invention, what I claim as new, and desire to secure by Letters Patent, is:—

1. A moistening device consisting of a chamber, a roller on which said chamber is mounted, a handle connected with the frame of the device, and an absorbent adapted to protrude through a throat in said chamber, said parts being combined substantially as described.

2. An arm provided with a handle, and having ears on its sides, in combination with a roller mounted on said ears, and a chamber which is connected with the front ends of said arm, and containing a piece of absorbent material, one end of which is adapted to protrude through a throat in the front of said chamber, substantially as described.

3. In a moistening device, a chamber provided with absorbent material and a throat through which a portion of said material may protrude, one of the walls of said chamber forming a deflector in front of said throat, substantially as described.

4. An arm provided with a handle, a roller mounted on said arm, and a chamber secured to the forward ends of said arm, said chamber being provided with a piece of absorbent material and having an opening for the protrusion of said absorbent piece, one of the walls of said chamber being extended downwardly in front of said throat, and forming a deflector, substantially as described.

AUGUST RINK.

Witnesses:
JOHN A. WIEDERSHEIM,
WM. C. WIEDERSHEIM.